US011359536B2

(12) United States Patent
West et al.

(10) Patent No.: US 11,359,536 B2
(45) Date of Patent: Jun. 14, 2022

(54) METHOD FOR CLEANING COOLING SYSTEM OF A WORK MACHINE AND SYSTEM THEREOF

(71) Applicants: DEERE & COMPANY, Moline, IL (US); Deere-Hitachi Construction Machinery Corporation, Kernersville, NC (US)

(72) Inventors: Sean P West, Dubuque, IA (US); Steven R Sass, Dubuque, IA (US); James A Schwalb, Dubuque, IA (US); Paul A Wantschik, Platteville, WI (US); Daniel L Lucas, Cascade, IA (US); Jason G Knipper, Peosta, IA (US); Jeffrey Flippin, Kernersville, NC (US); Jacob Henderson, Kernersville, NC (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/668,702

(22) Filed: Oct. 30, 2019

(65) Prior Publication Data

US 2021/0131335 A1     May 6, 2021

(51) Int. Cl.
    *F01P 11/06*       (2006.01)
    *F01P 5/04*        (2006.01)
    (Continued)

(52) U.S. Cl.
    CPC ............... *F01P 11/06* (2013.01); *B08B 5/02* (2013.01); *F01P 5/043* (2013.01); *F01P 7/08* (2013.01);
    (Continued)

(58) Field of Classification Search
    CPC .... F01P 11/06; F01P 5/043; F01P 7/08; F01P 2023/08; F01P 2037/00; B08B 5/02
    (Continued)

(56) References Cited

U.S. PATENT DOCUMENTS

| 2014/0261259 A1* | 9/2014 | Sullivan | F02F 7/007 |
|---|---|---|---|
| | | | 123/41.65 |
| 2015/0017901 A1* | 1/2015 | Pfohl | B60K 11/02 |
| | | | 454/141 |

(Continued)

FOREIGN PATENT DOCUMENTS

| DE | 102004059701 A1 | 6/2006 |
|---|---|---|
| DE | 202006008719 U1 | 9/2007 |
| DE | 102016221503 A1 | 5/2018 |

OTHER PUBLICATIONS

German Search Report issued in counterpart application No. 102020212144.3 dated May 12, 2021 (12 pages).

*Primary Examiner* — Lindsay M Low
*Assistant Examiner* — Omar Morales
(74) *Attorney, Agent, or Firm* — Taft Stettinius & Hollister LLP; Stephen F. Rost

(57) ABSTRACT

A control system for controlling a work machine includes an engine for producing power to propel the work machine during a normal operating mode, a cooling system for cooling at least the engine during the normal operating mode, and a controller for controlling the cleaning system during the normal operating mode and a clean operating mode. During the normal operating mode, the engine is running and the controller operably controls a cooling fan of the cooling system to rotate in a first rotational direction to produce a first air flow in a first direction. During the clean operating mode, the engine is not running and the controller operably controls the cooling fan to rotate in a second rotational direction to produce a second air flow in a second (Continued)

direction. The first rotational direction is opposite the second rotational direction, and the first direction is opposite the second direction.

20 Claims, 5 Drawing Sheets

(51) Int. Cl.
    *F01P 7/08*         (2006.01)
    *B08B 5/02*         (2006.01)
    *H02J 7/00*         (2006.01)

(52) U.S. Cl.
    CPC ....... *H02J 7/0063* (2013.01); *F01P 2011/065* (2013.01); *F01P 2023/08* (2013.01); *F01P 2037/00* (2013.01); *H02J 2007/0067* (2013.01)

(58) Field of Classification Search
    USPC ...................................................... 123/41.02
    See application file for complete search history.

(56) References Cited

U.S. PATENT DOCUMENTS

2016/0205869 A1*   7/2016   Wenzel ................ A01D 41/127
2017/0251601 A1*   9/2017   Dugas .................. A01F 12/444

* cited by examiner

METHOD FOR CLEANING COOLING SYSTEM OF A WORK MACHINE AND SYSTEM THEREOF

FIELD OF THE DISCLOSURE

The present disclosure relates to a work machine, and in particular, to a method and system for cleaning a cooling system of the work machine.

BACKGROUND

Work machines, such as those in the construction and forestry industries, may include a cooling system for providing air flow to an engine or other heat-generating device of the work machine. Heat exchangers, fans, and the like may form part of the cooling system. During a work operation, debris and other particulates can enter the cooling system and cause problems with cooling the engine. It is often necessary to perform a cleaning operation to remove the debris from the cleaning system. To do so, however, can be difficult as debris can often reach areas in the cooling system that are difficult to reach without removing or moving components such as a heat exchanger or fan to access those areas.

Thus, there is a need for a method and system to clean the cooling system without moving or removing equipment and other components during a cleaning operation.

SUMMARY

In one embodiment of the present disclosure, a control system for controlling a work machine includes an engine for producing power to propel the work machine during a normal operating mode; a cooling system for cooling at least the engine during the normal operating mode, the cooling system including a cooling fan; a controller for controlling at least the cooling system during the normal operating mode and a clean operating mode; wherein, during the normal operating mode, the engine is running and the controller operably controls the cooling fan to rotate in a first rotational direction to produce a first air flow in a first direction; wherein, during the clean operating mode, the engine is not running and the controller operably controls the cooling fan to rotate in a second rotational direction to produce a second air flow in a second direction; further wherein, the first rotational direction is opposite the second rotational direction, and the first direction is opposite the second direction.

In a first example of this embodiment, a battery is electrically coupled to the engine, the controller and the cooling fan, the battery providing electrical power to the cooling fan during the clean operating mode. In a second example, the battery comprises a current electrical charge; the controller operates the cooling fan to rotate in the second rotational direction only if the current electrical charge is above a threshold charge level. In a third example, the cooling fan rotates in the second rotational direction only if the engine is not running.

In a fourth example, the cooling system comprises a heat exchanger for cooling the engine, the heat exchanger being located between the cooling fan and the engine. In a fifth example, the cooling system comprises a heat exchanger for cooling the engine, the cooling fan being located between the heat exchanger and the engine. In a sixth example, a user input is disposed in communication with the controller, wherein the controller disables the normal operating mode and enables the clean operating mode upon receiving a command from the user input.

In a seventh example, a compressed air source is in communication with the controller, the compressed air source providing compressed air to flow in a direction substantially parallel to the second direction during the clean operating mode. In an eighth example, a door is provided for enclosing the cooling system and engine in an interior compartment of the machine; and a sensor is disposed in electrical communication with the controller, the sensor configured to detect a position of the door and communicate the position of the door to the controller. In a ninth example, in the normal operating mode, the first air flow is directed in the first direction towards the engine; and in the clean operating mode, the second air flow is directed in the second direction away from the engine.

In another embodiment of the present disclosure, a method for cleaning a cooling system of a work machine includes providing a controller, an engine, a cooling fan of the cooling system, a user input, and a battery; controlling the work machine in a normal operating mode with the engine running and the cooling fan rotating in a first rotational direction; receiving a command via the controller from the user input to operate in a clean operating mode; determining if the engine is running; detecting a current charge status of the battery via the controller; providing electrical power from the battery to the cooling fan; and operating the cooling fan to rotate in a second rotational direction during the clean operating mode, where the second rotational direction is opposite the first rotational direction.

In one example of this embodiment, the method includes sending an instruction to turn off the engine if the engine is running before the operating step. In a second example, the method includes comparing the current charge status to a charge threshold; performing the operating step if the current charge status is greater than the charge threshold. In a third example, the method includes not performing the operating step if the current charge status is less than the charge threshold.

In a fourth example, the method includes providing a heat exchanger of the cooling system between the cooling fan and the engine; producing a first air flow by the cooling fan during the normal operating mode, where the first air flow moves in a first direction towards the heat exchanger and engine; and producing a second air flow by the cooling fan during the clean operating mode, where the second air flow moves in a second direction away from the heat exchanger and engine.

In a fifth example, the method includes determining an amount of time to execute the clean operating mode by the controller as a function of the current charge status of the battery. In a sixth example, the method includes performing the operating step for the amount of time so long as the engine is not running and the current charge status is greater than a charge threshold. In a seventh example, the method includes disabling the clean operating mode if the engine is running, the current charge status is less than the charge threshold, or the amount of time expires.

In a further embodiment of the present disclosure, a work machine includes a chassis; a ground-engaging mechanism for supporting the chassis; an engine for operably driving the ground-engaging mechanism to propel the work machine during a normal operating mode; a battery electrically coupled to the engine to provide electrical power thereto; a controller electrically coupled to the battery; and a cooling system for cooling the engine during the normal operating mode, the cooling system including a cooling fan electrically coupled to the battery; wherein, the controller operably controls the cooling fan in the normal operating mode and a clean operating mode; wherein, during the normal operating mode, the engine is running and the cooling fan is operably controlled by the controller to rotate in a first rotational direction to produce a first air flow that moves in a first direction to cool the engine; wherein, during the clean operating mode, the engine is not running and the cooling fan is operably controlled by the controller to rotate in a second rotational direction to produce a second air flow that moves in a second direction away from the engine; further wherein, the first rotational direction is opposite the second rotational direction, and the first direction is opposite the second direction.

In an example of this embodiment, the work machine includes a heat exchanger of the cooling system located between the cooling fan and the engine; and a control logic executable by the controller during the clean operating mode to control the cooling fan to rotate in the second direction as long as the engine is not running and a current charge status of the battery is greater than a charge threshold.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
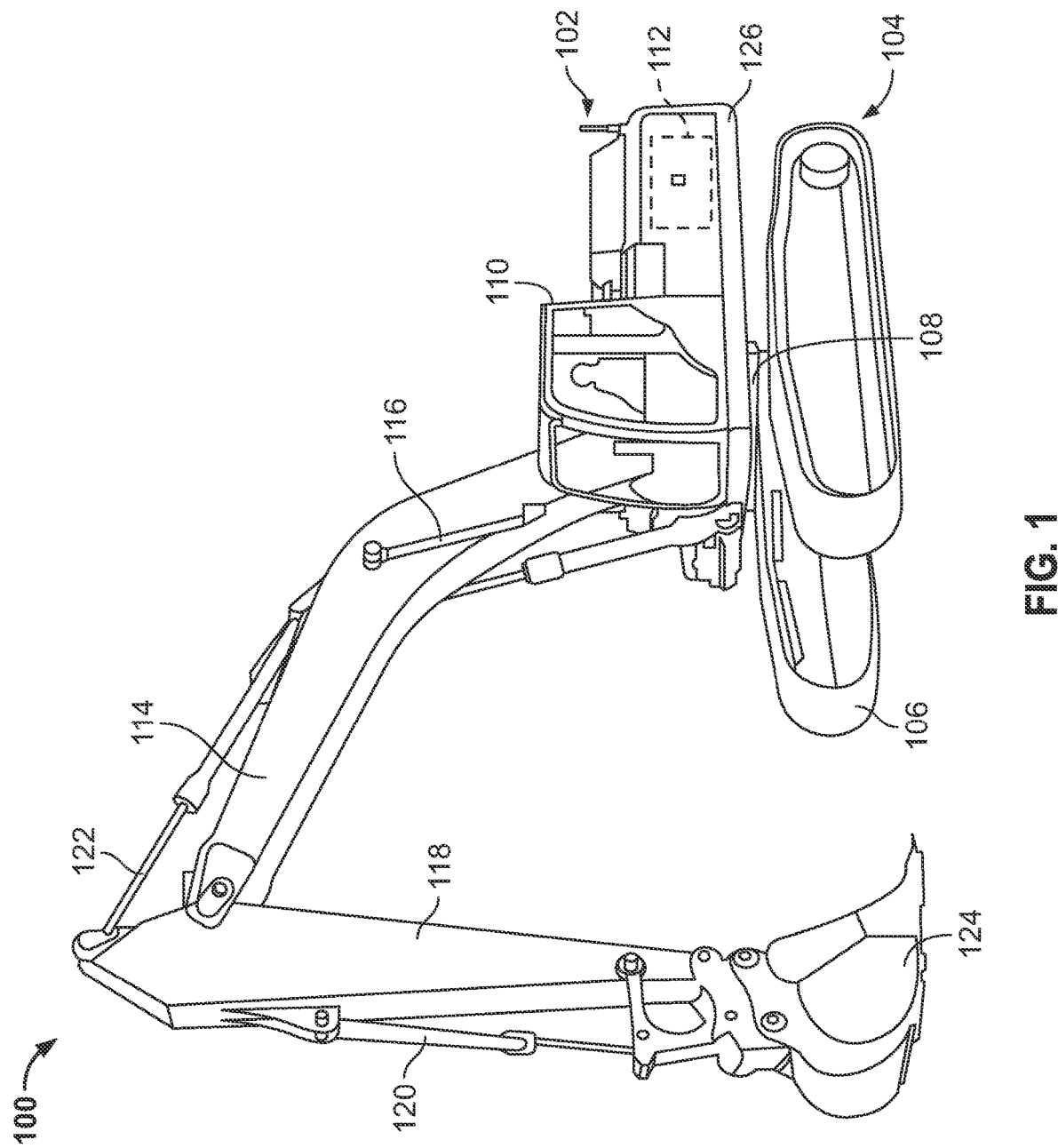
FIG. 1 is a side view of a work machine.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

An exemplary embodiment of a work machine is shown in FIG. 1. The machine is embodied as an excavator 100, but the present disclosure is not limited to an excavator and may extend to other work machines including crawlers, motor graders, loaders, feller bunchers, tractors, dump trucks, and other machines in the construction, forestry, and agricultural industries. As such, while the figures and forthcoming description may relate to an excavator, it is to be understood that the scope of the present disclosure extends beyond an excavator and, where applicable, the term "machine" or "work machine" will be used instead. The term "machine" or "work machine" is intended to be broader and encompass other vehicles besides an excavator for purposes of this disclosure.

Referring to FIG. 1, the machine 100 includes a chassis comprising an upper frame 102 pivotally mounted to an undercarriage 104. The upper frame 102 can be pivotally mounted on the undercarriage 104 by means of a swing bearing and pivot 108. The upper frame 102 is rotatable about 360° relative to the undercarriage 104 on the swing bearing and pivot 108. A swing drive (not shown) can pivot the upper frame 102 about the swing bearing and pivot 108.

The undercarriage 104 can include a pair of ground-engaging mechanisms such as tracks 106 on opposite sides of the undercarriage 104 for moving along the ground. Alternatively, the machine 100 can include wheels for engaging the ground. The upper frame 102 includes a cab 110 in which the machine operator controls the machine. The cab 110 can include a control system (not shown) including, but not limited to, a steering wheel, a control level, a joystick, control pedals, or control buttons. The operator can actuate one or more controls of the control system for purposes of operating the machine 100.

The machine 100 also includes a boom 114 that extends from the upper frame 102 adjacent to the cab 110. The boom 114 is rotatable about a vertical arc by actuation of a pair of boom cylinders 116. A dipper stick or arm 118 is rotatably mounted at one end of the boom 114 and its position is controlled by a hydraulic cylinder 122. The opposite end of the boom 114 is coupled to the upper frame 102. At the end opposite the boom 114, the dipper stick or arm 118 is mounted to a bucket 124 that is pivotable relative to the arm 118 by means of a hydraulic cylinder 120.

The upper frame 102 of the machine 100 includes an outer shell cover to protect one or more engine assemblies 112. At an end opposite the cab 110, the upper frame 102 includes a counterweight 126. The counterweight 126 adds weight to the rear of the machine 100 to offset a load collected in the bucket 124 at the front of the machine 100. The offset weight can improve the digging performance of the machine 100.

In a conventional work machine such as the excavator 100 of FIG. 1, a cooling system may be employed for cooling the one or more engine assemblies 112. The cooling system may include one or more heat exchanges or fans operably controlled for directing a flow of cooler air towards the one or more engine assemblies 112 to provide cooling. This is particularly the case during normal machine operation when the one or more engine assemblies 112 can generate substantial heat.

During normal machine operation, debris and other contaminants can get into the cooling system and cause problems with the cooling system and other components of the machine. Thus, it is often necessary to perform periodic maintenance of the machine to remove debris and other contaminants from the cleaning system and the interior of the machine. During this time, machine operation is discontinued and an operator or technician can open an exterior door of the machine to access the cleaning system. The operator or technician may use an air wand, pressure washer or other source of compressed air and manually remove the debris and other contaminants from the cleaning system.

Figure 2:
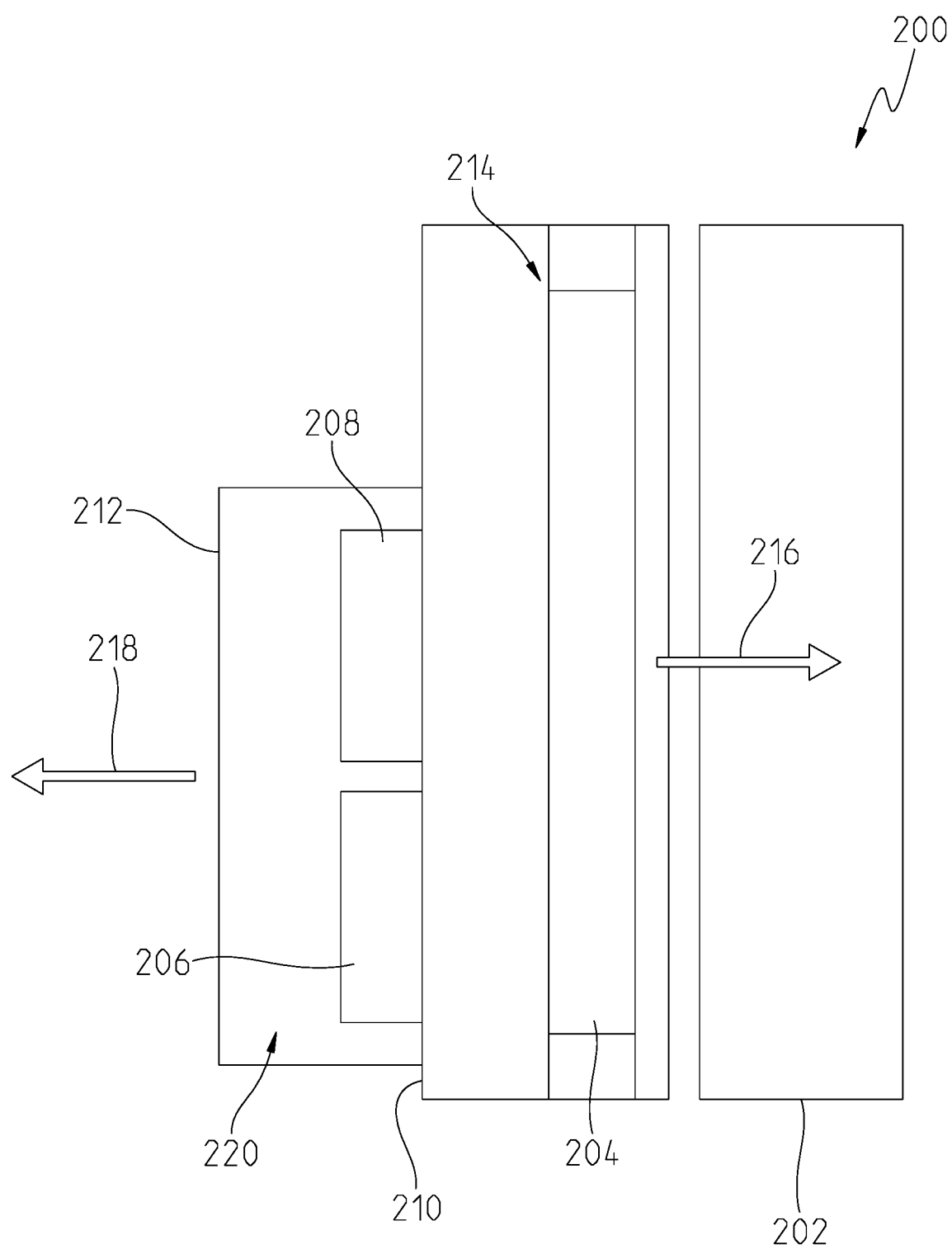
FIG. 2 is a cross-sectional schematic of a first embodiment of a cooling system of the work machine of FIG. 1.

In FIG. 2, for example, a first embodiment of a cleaning system 200 of a work machine is shown. In this system 200, an engine 202 is illustrated capable of providing power to drive the machine. The engine 202 may include one or more engines. An exterior door 212 may be coupled to the machine such as the upper frame 102 thereof. The exterior door 212 may be opened or closed to gain access to the interior of the cleaning system 200. In other cases, the door 212 may be removed from the machine to gain access.

The cooling system 200 may include a heat exchanger 204 as shown in FIG. 2. The heat exchanger 204 may include one or more heat exchangers for cooling the engine 202. The heat exchanger 204 may be any conventional heat exchanger known in the art. In addition, the cooling system 200 may include a first fan 206 and a second fan 208. The first and second fans may be operably controlled to provide an air flow in a first direction 216 as shown in FIG. 2 during normal machine operation. To do so, the first and second fans may be rotatably driven in a first rotational direction to provide the air flow in the first direction 216. While only two fans are shown, it is to be understood that any number of fans may be incorporated in the cleaning system 200. For instance, in a first example, a single fan may be used. In a second example, two or more fans may be used. In a third example, a plurality of fans may be used. The fans may be electrically driven, hydraulically drive, pneumatically driven, or operably driven in any known way.

In the cooling system of FIG. 2, the one or more cooling fans may be coupled to a support member 210 in the interior of the machine. The support member 210 may be a plate, flange, or other support structure coupled to the chassis of the machine. The chassis may comprise the upper frame 102, the lower frame 104, or a combination thereof.

During normal machine operation, debris and other contaminants may enter the interior of the machine and collect in a first debris zone 214 located between the one or more fans 206, 208 and the heat exchanger 204. Debris and other contaminants may also collect in a second debris zone 220 located between the one or more fans 206, 208 and the exterior door 212. While only two debris zones are illustrated in FIG. 2, it is possible debris can collect in other areas in the cooling system but which are not shown for purposes of this embodiment. Nonetheless, all debris in the cooling system may be cleaned during a machine cleaning operation.

In the first embodiment of the cooling system, it can be difficult for an operator to manually access the first debris zone 214 due to the location of the cooling fans. In a conventional system, the cooling fans may need to be removed from the cooling system in order to clean the heat exchanger coils with an air wand or pressure washer. Alternatively, the cooling fans may need to be mounted on a tilt-out or pivoting door to pivotally move the fans out of the way. Once the cooling fans are removed, the manual air wand or pressure washer may access the first debris zone 214 and blow pressurized air to remove debris and other contaminants in a reverse air flow direction indicated by arrow 218.

Figure 3:
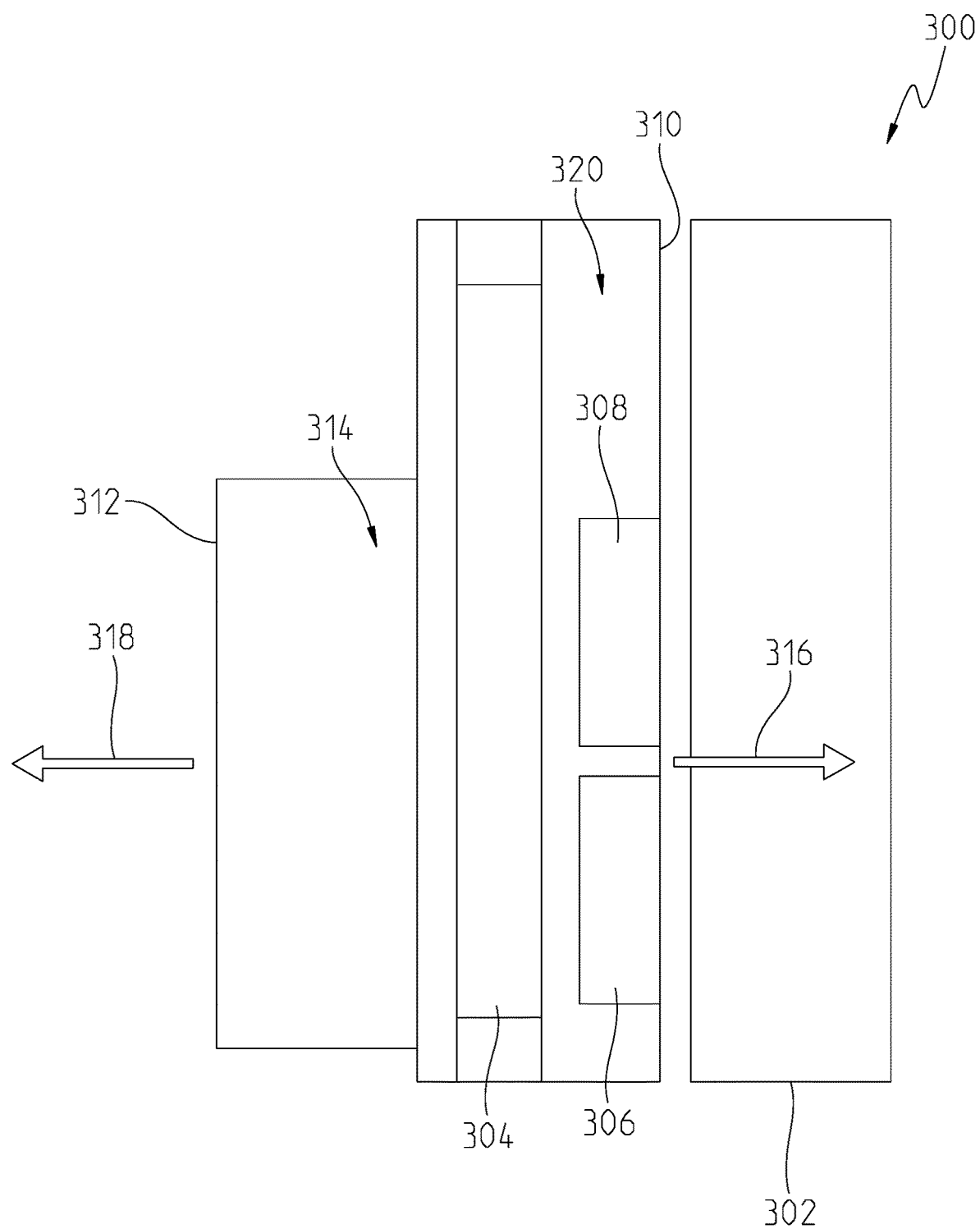
FIG. 3 is a cross-sectional schematic of a second embodiment of a cooling system of the work machine of FIG. 1.

In FIG. 3, a second embodiment of a cooling system 300 of a work machine is shown. In this cooling system 300, an engine 302 is illustrated capable of providing power to drive the machine. The engine 302 may include one or more engines. An exterior door 312 may be coupled to the machine such as the upper frame 102 thereof. The exterior door 312 may be opened or closed to gain access to the interior of the cleaning system 300. In other cases, the door 312 may be removed from the machine to gain access.

The cooling system 300 may further include a heat exchanger 304 as shown in FIG. 3. The heat exchanger 304 may include one or more heat exchangers for cooling the engine 302. The heat exchanger 304 may be any conventional heat exchanger known in the art. In addition, the cooling system 300 may include a first fan 306 and a second fan 308. The first and second fans 306, 308 may be operably controlled to provide an air flow in a first direction 316 as shown in FIG. 3 during normal machine operation. To do so, the first and second fans 306, 308 may be rotatably driven in a first rotational direction to provide the air flow in the first direction 316. While only two fans are shown, it is to be understood that any number of fans may be incorporated in the cleaning system 300. For instance, in a first example, a single fan may be used. In a second example, two or more fans may be used. In a third example, a plurality of fans may be used. The fans may be electrically driven, hydraulically drive, pneumatically driven, or operably driven in any known way.

In the cooling system of FIG. 3, the one or more cooling fans may be coupled to a support member 310 in the interior of the machine. The support member 310 may be a plate, flange, bracket, or other support structure coupled to the chassis of the machine. The chassis may comprise the upper frame 102, the lower frame 104, or a combination thereof.

During normal machine operation, debris and other contaminants may enter the interior of the machine and collect in a first debris zone 314 located between the heat exchanger 304 and the exterior door 312. Debris and other contaminants may also collect in a second debris zone 320 located between the one or more fans 306, 308 and the heat exchanger 304. While only two debris zones are illustrated in FIG. 3, it is possible debris can collect in other areas in the cooling system 300 but which are not shown for purposes of this embodiment. Nonetheless, all debris in the cooling system 300 may be cleaned during a machine cleaning operation.

In the second embodiment of the cooling system 300, it can be difficult for an operator to manually access the second debris zone 320 due to the location of the heat exchanger 304. The cooling fans 306, 308 may also need to be removed from or pivoted out of their normal position in the cooling system 300 in order to clean the heat exchanger coils with an air wand or pressure washer.

With regards to the cooling systems of FIGS. 2 and 3, the process of cleaning the cooling system is generally done with a source of pressurized air from the engine side of the heat exchanger 304. In these systems, this is the opposite of the normal flow 216, 316 of air through the system during normal machine operation. In other words, a flow of pressurized air from the source in a reverse direction 218, 318 is used to remove the debris and clean the cooling system during a cleaning operation.

In the present disclosure, a new control system and cleaning process is provided for cleaning the cooling system without requiring the removal of any equipment (e.g., the cooling fans or heat exchanger). Moreover, it is unnecessary to move any of the equipment to different positions through the new system and cleaning process in order to effectively clean the cooling system. Instead, in one embodiment of the present disclosure, the cooling system 200 of FIG. 2 may include a controller capable of controlling the first cooling fan 206 and second cooling fan 208 to rotate in a second, opposite direction from normal machine operation so as to generate an air flow in the reverse direction 218 towards the exterior door 212. In effect, the cooling fans 206, 208 are capable of augmenting or supporting the cleaning operation by pushing additional air flow through the heat exchanger core to remove debris therefrom. In the cooling system 200 of FIG. 2, the cooling fans are already located on the cold side of the heat exchanger 204 and can thus suction in cooler air and push it through the heat exchanger 204 to remove debris. If the door 212 is in its closed position, the additional air flow is able to remove any debris that may be stuck on the inner side of the door. If the door 212 is opened, the cooling fans can help push the debris to the external environment and thus clean the cooling system 200.

With regards to the cooling system of FIG. 3, the cooling fans 306, 308 may also be controlled to operate in a reverse rotational direction compared to normal operation and assist with cleaning the heat exchanger 304.

Figure 4:
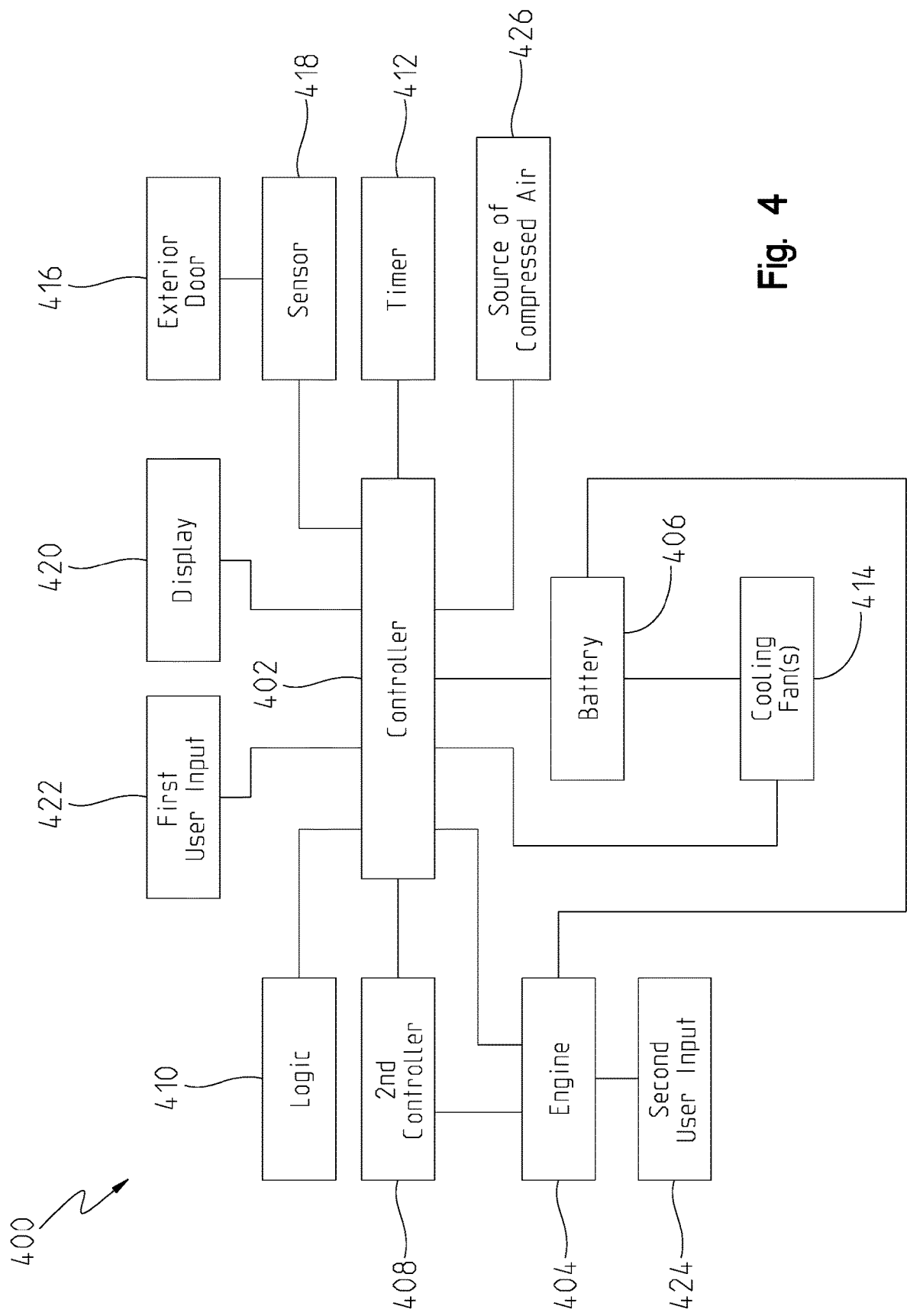
FIG. 4 is a control system for controlling a cooling system during a clean machine mode.

In FIG. 4, an embodiment of a control system 400 is illustrated for executing a cleaning operation of the cooling system. In this system 400, a controller 402 may be provided with a memory unit and processor for executing a control logic 410. The control logic 410 may be stored in the memory unit of the controller 402. The controller 402 may be a fan controller or a general controller for controlling the cooling system operation. Moreover, the controller 402 may be a general controller for controlling machine operation. Further, the controller 402 may be an engine controller, a transmission controller, or any other controller on the machine.

The controller 402 may be in communication with an engine 404 which provides power to propel the machine in a travel direction. In at least one example, the engine 404 may be controlled by a second controller 408 which may take the form of an engine controller. The second controller 408 may be in electrical communication with the controller 402.

A battery 406 or other electrical power source may be electrically coupled to the controller 402 and engine 404 to provide electrical power to both. The battery 406 may comprise a battery pack of a plurality of batteries. The battery 406 may include a charge state which defines how much stored energy is in the battery 406 for electrically powering the controller 402 and engine 404. In at least one embodiment, there may be a second battery (not shown) which functions as a backup battery in the event the battery 406 is unable to provide electrical power to the controller 402 or engine 404. Moreover, there may be an alternator or other similar device (not shown) for restoring the electrical charge to the battery 406 when the engine 404 is running.

Similar to the embodiments of FIGS. 2 and 3, the cooling system may include one or more cooling fans 414. The cooling fans 414 may be a single fan or a plurality of cooling fans. In the illustrated embodiment of FIG. 4, the cooling fans 414 may be electrically powered to provide an air flow for cooling purposes. In FIG. 4, the cooling fans 414 may receive electrical power from the battery 414. In other examples, the cooling fans 414 may receive electrical power from another source. It is also possible that the cooling fans 414 may be powered by other means. For instance, the cooling fans 414 may be hydraulically powered, pneumatically powered, electro-mechanically powered, electro-hydraulically powered, or powered in any other known way.

In the embodiment of FIG. 4, the cooling fans 414 may be operated independently of the engine 404. In other words, the engine 404 may be shut off while the cooling fans 414 remain operational due to receiving electrical energy from the battery 406 and being controlled by the controller 402.

In the control system 400, there may be one or more user inputs for communicating instructions to the controller 402 and/or second controller 408. In FIG. 4, for example, a first user input 422 and a second user input 424 are shown. Each user input may be a separate user control in a cab of the work machine. The user input may be a button, switch, lever, joystick, wheel, toggle, dial, or other type of control. Alternatively, the user input may be displayed on a display screen 420 in the cab. The user input may be an icon that is triggered on a touchscreen, for example. In one non-limiting example, the display 420 may illustrate different commands that a user may select including the first user input 422 and second user input 424.

In one embodiment, the first user input 422 may be triggered by a machine operator to communicate to the controller 402 to execute a machine cleaning operation as defined in the control logic 410. The second user input 424 may be, for example, an ignition switch or button used to disable the engine 404. Additional user inputs and controls may be provided to control normal and machine cleaning operations, and thus FIG. 4 only provides a partial embodiment of the different possible controls.

The controller 402 may be designed to include its own timer 412 for controlling how long a cleaning operation can be executed. This may be used, for example, to avoid completely draining the battery 406 of its charge while the engine 404 is off. In this way, the controller 402 may be in communication with the battery 406 so that it is able to monitor the status of battery charge during the cleaning operation. The controller 402 may include internal logic, a look-up table, chart, graph, or calculate on its own how long the battery 406 can provide power to the cooling fans 414 with the engine 404 disabled before the level of charge of the battery 406 falls below a threshold at which it cannot restart the engine 404. In other words, the controller 402 may be able to determine from logic or otherwise that at 80% charge the cleaning operation can run for an X amount of time whereas at 60% charge the cleaning operation can only run for Y amount of time, where X is greater than Y.

Moreover, the controller 402 may include logic in which the controller 402 determines that below a certain charge level, the cleaning operation cannot be executed. This may happen if the battery is low and needs to be recharged or it may not be able to restart the engine 404. This low battery threshold level may be predefined and stored in the controller 402 to ensure that the machine cleaning operation is not executed when the battery charge status is at or less than the low battery threshold level.

As described with respect to FIGS. 2 and 3, the cooling system may be positioned within an internal compartment or location of the machine. As such, an exterior door may enclose the cooling system within the internal compartment. In FIG. 4, an exterior door 416 is shown. A sensor 418 may be placed on or at a location relative to the door 416 in order to detect if the door 416 is in its open position or closed position. The door 416 may include a latch (not shown) or other similar device for locking or holding the door 416 in its closed position. The sensor 418 may be able to detect the condition of the latch as well. In any case, the sensor 418 may be in communication with the controller 402 to alert the controller 402 to the position of the door 416. During a cleaning operation, the controller 402 may determine the position of the door 416 based on a signal received from the sensor 418. In one example, the controller 402 may communicate to the operator that the door 416 needs to be opened or closed for a portion of the operation. In another example, the controller 402 may be configured to control an actuator or the like for automatically opening or closing the door during a cleaning operation. In any event, the controller 402 may be able to determine the position of the exterior door 416 based on a signal from the sensor 418.

As also described above, compressed air may be used to further clean the heat exchanger and remainder of the cooling system. In conventional systems, a user such as the operator or technician manually uses an air wand or pressure washer to provide compressed air to the cooling system. In the embodiment of FIG. 4, however, a source of compressed air 426 is shown being in communication with the controller 402. In one example, the source of compressed air 426 may be automatically controlled by the controller 402. For example, the compressed air may be stored in a reservoir and a pump, hose, sprayer, or other device may be used to release the compressed air into the cooling system for cleaning.

During a cleaning operation, the air flow from the cooling fans 414 and source of compressed air 426 may be in the same general direction such that air is pushed through the cooling system towards the exterior door 416 and outside the machine when the door is open.

Figure 5:
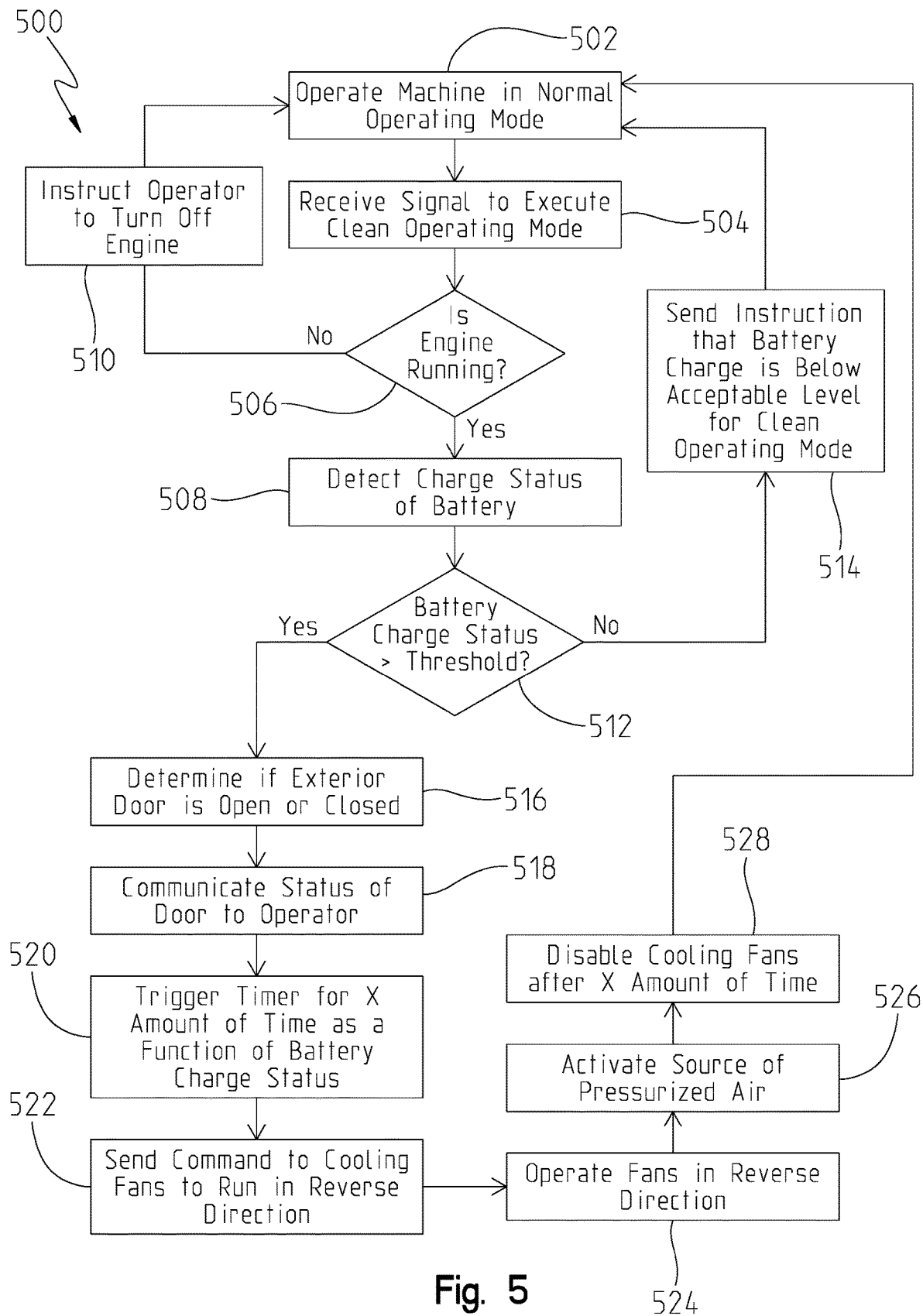
FIG. 5 is a flow diagram of a method for executing a clean machine mode of a work machine.

Referring to FIG. 5, one embodiment of a machine cleaning method is shown. In this embodiment, the method 500 is shown including a plurality of blocks or steps which are executed for performing a cleaning operation of the cooling system of the machine. This method 500 may include additional blocks or steps in another embodiment, or it may include fewer blocks or steps in a different embodiment. Moreover, while the blocks or steps are shown in a certain order in FIG. 5, it is understood that the blocks or steps may be executed in a different order. Further, two or more of the blocks or steps may be executed simultaneously or may be optional in other embodiments. Thus, FIG. 5 represents one embodiment of a control method for cleaning the cooling system of the machine, but it is not intended to be limiting with respect to other possible embodiments that fit within the scope of the present disclosure.

In FIG. 5, the method 500 may include a first block 502 in which the machine is functioning in its normal operating mode. Here, the engine 404 is running and producing power to propel the machine in a manner desired by the operator. As the machine is operating according to a normal operating mode, the controller 402 may receive an instruction from the operator via a first user input 422 to execute a machine cleaning process. The machine cleaning process may be referred to a clean operating mode which is different from the normal machine operating mode.

As the controller 402 receives the instruction in block 504, it may then execute control logic to perform the cleaning process. The method 500 may advance to block 506 where the controller 402 determines if the engine 404 is still running. If the engine is running, then the controller 402 may send a command to the operator in block 510 to turn off the engine 404. With the engine 404 still running, the control logic may return to block 502 where the machine continues to function under its normal operating mode and the clean operating mode is disabled.

In an alternative embodiment to what is shown in FIG. 5, the controller 402 may be programmed such that if it receives the command in block 504 and the engine is still running in block 506, it may determine that the operator desires for the engine to be shut off so that the clean operating mode may be executed. Under this circumstance, the controller 402 may be programmed to disable the engine or send an instruction to the second controller 408 to shut off the engine 404. There may be other factors or determinations that must be made by the controller 402 before it turns off the engine 404 including current machine speed, engine speed, torque, and the like. For purposes of this disclosure, it is sufficient that according to one embodiment the controller 402 may turn off the engine in block 506.

In the event the controller 402 determines that the engine 404 is not running in block 506, the method 500 may advance to block 508. Here, the controller 402 may determine a charge status of the battery 406. In other words, the controller 402 is determining if the battery 406 has sufficient charge to electrically power at least the cooling fans 414 and the controller 402 during the clean operating mode. Once it determines the charge status in block 508, the controller 402 may compare the current charge status of the battery 406 to a charge threshold indicative of a low battery. If the current battery charge is less than the threshold level, then in block 514 the controller 402 may send a communication to the operator that the battery charge is currently too low for the clean operating mode and the machine may continue to operate in its normal operating mode. As described above, the battery threshold level is designed to ensure that the battery 406 has sufficient charge to restart the engine 404. If the battery falls below this level, then it may not be able to restart the engine 404 and the control logic may be designed to avoid this situation.

If it is determined that the current charge is greater than the threshold level in block 512, the method 500 may advance to block 516. Here, the controller 402 may be configured to determine if the exterior door 416 is open or closed. This may be an optional step in the process, but in any event, in at least one embodiment the clean operating mode may not be executed with the door closed. In other embodiments, the clean operating mode may be executed regardless of the position of the door 416. Further, in another embodiment, the clean operating mode may be executed with the door 416 first being closed in order to remove any debris from the inner surface of the door. These determinations and resulting steps may be executed in block 516. Moreover, the controller 402 may communicate the status of the door 416 to the operator in block 518.

For purposes of this disclosure, the communications from the controller 402 to the operator may be displayed visually on a display 420 in the cab. Other communications may be audible alerts, or other lights or displays may be illuminated in the cab or elsewhere on the machine to communicate with the operator.

Once preconditions regarding the engine in block 506, the battery in block 512, and/or the door in block 516 are executed and determined to be satisfied, the controller 402 may continue executing the method 500 by triggering a timer 412 for a certain amount of time based on the charge status of the battery 406. The amount of time may be predefined in a table, chart, algorithm, or in the control logic. The controller 402 may access the information necessary to determine how long to run the clean operating mode with the engine 404 disabled. Once the controller 402 determines how long to execute the clean operating mode, it triggers the timer in block 520.

During the normal operating mode, the controller 402 can operate the cooling fans 414 such that the fans rotate in a first rotational direction to direct air flow in a first direction. In FIG. 2, the air flow from the cooling fans may flow in the first direction 216 through the heat exchanger and to the engine compartment to cool the engine. In FIG. 3, the air flow from the fans may flow in the first direction 316 to the engine compartment. In each embodiment, the controller 402 is able to control the operation of the cooling fans.

Once the clean operating mode is initiated, however, the controller 402 can disable the cooling fans 414 from rotating in the first rotational direction. Further, the controller 402 may send a command to the cooling fans 414 to rotate in a second rotational direction which is opposite the first rotational direction. In other words, the controller 402 is able to control the fans to rotate in a reverse direction. As it does, the cooling fans are powered by the battery 406 and may produce an air flow in a second direction opposite the first direction. In FIG. 2, the cooling fans produce an air flow in the second direction 218 away from the heat exchanger, and in FIG. 3 the air flow is through the heat exchanger in the second direction 318. In either case, the controller 402 is able to control the fans in the reverse direction in block 524 to remove debris from the cooling system and direct it towards the exterior door 416.

In one embodiment, the cooling fans 414 operating in reverse may be sufficient to perform the clean operating mode. In another embodiment, a source of pressurized or compressed air may be used to further clean the cooling system in block 526. In one aspect, the operator or a technician may use an air wand or air compressor to provide the compressed air during the clean operating mode. In another aspect, a source of the compressed air may be automatically controlled by the controller 402 to direct compressed air into the cooling system to remove debris therefrom. In any event, the flow of compressed air through the cooling system may be in the same direction as the air flow from the cooling fans 414. In this way, the cooling fans 414 running in reverse may be used to supplement or perform the cleaning operation without having to be removed or moved from their normal position.

As the clean operating mode is being executed by the controller 402, the controller 402 may continuously monitor the charge level of the battery 406. In the event the battery charge level falls below the threshold level in block 512, the controller 402 may discontinue executing the clean operating mode. Moreover, if the engine is started during the clean operating mode, the controller 402 may disable the clean operating mode. Further, if the door is closed during a portion of the clean operating mode, the controller 402 may communicate to the operator to open the door so that the debris and other contaminants can be removed from the interior of the machine.

In block 528, the controller 402 may continue executing the clean operating mode until the timer expires. In other words, the amount of time determined to run the clean operating mode in block 520 may expire in block 528, and the controller 402 may disable the clean operating mode in order to ensure enough charge is left on the battery 406 to restart the engine 404. As the clean operating mode is disabled, the control method 500 may return to block 502 for normal machine operation.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A control system for controlling a work machine, comprising:
an engine for producing power to propel the work machine during a normal operating mode;
a cooling system for cooling at least the engine during the normal operating mode, the cooling system including a cooling fan;
a controller for controlling at least the cooling system during the normal operating mode and a clean operating mode; and
a battery electrically coupled to the engine, the controller and the cooling fan, the battery providing electrical power to the cooling fan during the clean operating mode;
wherein, during the normal operating mode, the engine is running and the controller operably controls the cooling fan to rotate in a first rotational direction to produce a first air flow in a first direction;
wherein, during the clean operating mode, the engine is not running and the controller operably controls the cooling fan to rotate in a second rotational direction to produce a second air flow in a second direction;
wherein, the battery comprises a current electrical charge, and the controller operates the cooling fan to rotate in the second rotational direction only if the current electrical charge is above a threshold charge level;
further wherein, the first rotational direction is opposite the second rotational direction, and the first direction is opposite the second direction.

2. The control system of claim 1, wherein the cooling fan rotates in the second rotational direction only if the engine is not running.

3. The control system of claim 1, wherein the cooling system comprises a heat exchanger for cooling the engine, the heat exchanger being located between the cooling fan and the engine.

4. The control system of claim 1, wherein the cooling system comprises a heat exchanger for cooling the engine, the cooling fan being located between the heat exchanger and the engine.

5. The control system of claim 1, further comprising a user input disposed in communication with the controller, wherein the controller disables the normal operating mode and enables the clean operating mode upon receiving a command from the user input.

6. The control system of claim 1, further comprising a compressed air source in communication with the controller, the compressed air source providing compressed air to flow in a direction substantially parallel to the second direction during the clean operating mode.

7. The control system of claim 1, further comprising:
a door for enclosing the cooling system and engine in an interior compartment of the machine; and
a sensor disposed in electrical communication with the controller, the sensor configured to detect a position of the door and communicate the position of the door to the controller.

8. The control system of claim 1, wherein:
in the normal operating mode, the first air flow is directed in the first direction towards the engine; and
in the clean operating mode, the second air flow is directed in the second direction away from the engine.

9. A method for cleaning a cooling system of a work machine, comprising:
providing a controller, an engine, a cooling fan of the cooling system, a user input, and a battery;
controlling the work machine in a normal operating mode with the engine running and the cooling fan rotating only in a first rotational direction;
receiving a command via the controller from the user input to operate in a clean operating mode;
determining if the engine is running;
detecting a current charge status of the battery via the controller;
providing electrical power from the battery to the cooling fan; and
operating the cooling fan to rotate only in a second rotational direction during the clean operating mode only if the engine is disabled, where the second rotational direction is opposite the first rotational direction.

10. The method of claim 9, further comprising sending an instruction to turn off the engine if the engine is running before the operating step.

11. The method of claim 9, further comprising:
comparing the current charge status to a charge threshold;
performing the operating step if the current charge status is greater than the charge threshold.

12. The method of claim 11, further comprising not performing the operating step if the current charge status is less than the charge threshold.

13. The method of claim 9, further comprising:
providing a heat exchanger of the cooling system between the cooling fan and the engine;
producing a first air flow by the cooling fan during the normal operating mode, where the first air flow moves in a first direction towards the heat exchanger and engine; and
producing a second air flow by the cooling fan during the clean operating mode, where the second air flow moves in a second direction away from the heat exchanger and engine.

14. The method of claim 13, further comprising supplying compressed air in the second direction during the clean operating mode.

15. The method of claim 9, further comprising determining an amount of time to execute the clean operating mode by the controller as a function of the current charge status of the battery.

16. The method of claim 15, further comprising performing the operating step for the amount of time so long as the engine is not running and the current charge status is greater than a charge threshold.

17. The method of claim 16, further comprising disabling the clean operating mode if the engine is running, the current charge status is less than the charge threshold, or the amount of time expires.

18. A work machine, comprising: a chassis; a ground-engaging mechanism for supporting the chassis; an engine for operably driving the ground-engaging mechanism to propel the work machine during a normal operating mode; a battery electrically coupled to the engine to provide electrical power thereto; a controller electrically coupled to the battery; and a cooling system for cooling the engine during the normal operating mode, the cooling system including a cooling fan electrically coupled to the battery; wherein, the controller operably controls the cooling fan in the normal operating mode and a clean operating mode; wherein, during the normal operating mode, the engine is running and the cooling fan is operably controlled by the controller to rotate in a first rotational direction to produce a first air flow that moves in a first direction to cool the engine; wherein, during the clean operating mode, the engine is not running and the cooling fan is operably controlled by the controller to rotate in a second rotational direction to produce a second air flow that moves in a second direction away from the engine; wherein, the first rotational direction is opposite the second rotational direction, and the first direction is opposite the second direction; wherein, the battery comprises a current electrical charge, and the controller operates the cooling fan to rotate in the second rotational direction only if the current electrical charge is above a threshold charge level.

19. The work machine of claim 18, wherein the cooling system comprises a heat exchanger for cooling the engine, the cooling fan being located between the heat exchanger and the engine.

20. The work machine of claim 18, further comprising:
a door coupled to the chassis for enclosing the cooling system and engine in an interior compartment of the machine; and
a sensor disposed in electrical communication with the controller, the sensor configured to detect a position of the door and communicate the position of the door to the controller.

* * * * *